United States Patent

[11] 3,604,716

| [72] | Inventor | Jacques Webert<br>46 Rue Victor Basche, 92-Montrouge, France |
|---|---|---|
| [21] | Appl. No. | 881,431 |
| [22] | Filed | Dec. 2, 1969 |
| [45] | Patented | Sept. 14, 1971 |
| [32] | Priority | Dec. 3, 1968 |
| [33] | | France |
| [31] | | 176370 |

[54] SELF-TIGHTENING SEAL
4 Claims, 6 Drawing Figs.

[52] U.S. Cl. .................................................. 277/26, 277/203
[51] Int. Cl. ................................................... F16j 9/00, F02f 5/00
[50] Field of Search ....................................... 277/26, 203; 418/179, 143

[56] References Cited
UNITED STATES PATENTS

| 1,761,808 | 6/1930 | Weaver ........................ | 277/26 |
| 1,857,961 | 5/1932 | Lamb ........................... | 277/26 |

FOREIGN PATENTS

| 738,907 | 9/1943 | Germany ...................... | 277/26 |
| 888,138 | 1/1962 | Great Britain ............... | 277/26 |

Primary Examiner—Samuel B. Rothberg
Attorney—Cameron, Kerkam & Sutton

ABSTRACT: The seal produces a self-tightening action as a function of temperature particularly when the temperature is low.

It comprises external deformable packing element and a core formed by two metals with different expansion coefficient, these metals being disposed in such a way that the metal with higher expansion coefficient is near the packing element and that, when the temperature decreases, the differential expansion of the two metals produces an expansion of the core toward this packing.

SELF-TIGHTENING SEAL

There are many different types of seals at present in use but, regardless of shape or design, the majority of seals produce their action only under the effect of clamping between the components which are to be made leaktight or pressureproof.

It is therefore essential to subject the seals to a continuous stress in order to obtain a high standard of tightness.

In order to endeavor to reduce the value of this stress, consideration has been given to the possibility of forming seals by means of metal cores which are capable of expanding under the action of heat. Seals and especially piston rings have thus been formed and employed effectively and practically without clamping stress.

However, the standard of tightness of seals of this type is low at room temperature or at the time of any momentary temperature drop. The application of these seals is therefore limited to components which operate normally at high temperatures.

One object of the invention is to provide a seal which produces self-tightening action as a function of temperature and permits the reduction and even suppression of clamping stresses even in the case of low temperatures.

Another object of the invention is to provide a seal which comprises a deformable external packing element and a core formed of at least two metals having a different coefficient of expansion, a metal having a high coefficient of expansion being placed opposite to the packing element and a metal having a low coefficient of expansion being superposed on and intimately bonded to the first so that the differential expansion of said metals under the effect of a reduction in heat causes deformation of said packing element.

Since the two metals which have a different coefficient of expansion are intimately bonded by rolling, for example, the complementary expansion or deflection of the assembly as a function of a variation in temperature is the resultant of the elongation forces. The deflection takes place in the direction of the metal which has a low coefficient of expansion at the time of a temperature rise but takes place in the opposite direction, namely towards the metal which has the higher coefficient of expansion, in the case of a temperature drop. The packing element is accordingly caused to expand and is deformed in the direction of application or tightening against the external component to be sealed under the action of a temperature drop whilst the seal is tightened against the other component as a result of an increase in temperature.

The core may be annular, for example, and mounted within a seal which is intended to be employed as a piston ring for ensuring leaktightness in the cold state.

Said core or core element can also be placed within a seal which is intended to be employed in a cryogenic apparatus and thus to ensure a very high standard of leaktightness at very low temperatures.

In another embodiment, the seal comprises a ring adapted to carry strips which are cut obliquely in the direction of rolling of the bimetal and twisted as a result of any temperature variation and an external packing element in the form of a sheath whose parallel walls are thrust outwards by each of said strips.

Deformation of the seal and application of the sheath against the components to be sealed are thus caused by any change of temperature in the direction of increase or decrease, leaktightness or pressuretightness being ensured in all cases.

Irrespective of the form of construction which is chosen, stresses induced by the components are practically nullified and the seal is active.

Further properties and advantages of the invention will in any case become apparent from the following description of embodiments which are given by way of nonlimitative example and illustrated in the accompanying drawings, in which.

Figure 1:
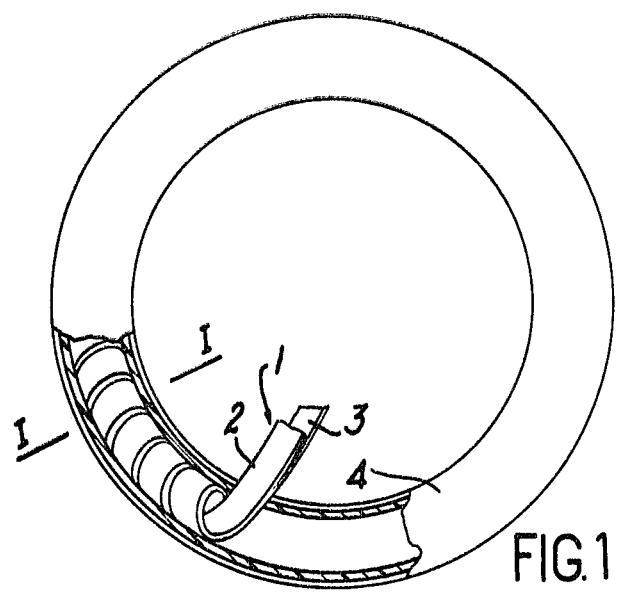
FIG. 1 is an external view which is partially broken away and shows an annular self-tightening seal.

The examples of construction which are illustrated in the drawings and which will now be described relate to annular seals but it must be clearly understood that this particular design is given solely by way of indication in order to enchance the clarity of the description and that the invention also extends to rectilinear seals or seals having any other shape.

Figure 2:
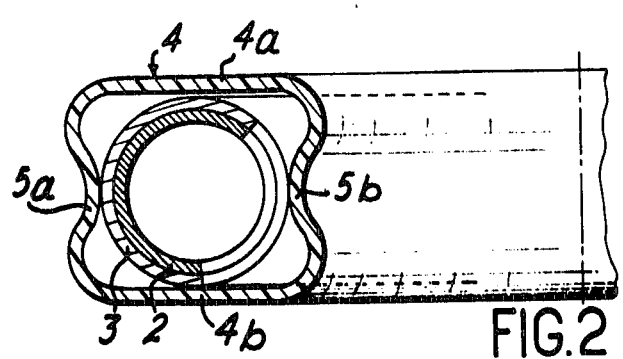
FIG. 2 is a sectional view taken along line I—I of FIG. 1.

The seal which is illustrated in FIGS. 1 and 2 comprises essentially a metallic core 1 constituted by a helical winding of a bimetal consisting of two superposed layers 2 and 3 formed by two metals having different coefficients of thermal expansion. These two layers may be joined together if necessary by means of an intermediate layer but in all cases are intimately bonded by rolling, for example.

The helix 1 is placed within an outer cover or packing element 4 which forms an annular sheath. Said sheath is made of a deformable material such as brass, titanium or plastic material. Preferably, the cross section of said sheath has substantially the shape of a quadrilateral with rounded corners. Two opposite sides 4a and 4b of said quadrilateral are flat, parallel and tangent to the helix 1 whilst the other two sides have a fold 5a and 5b forming an internal boss which is tangent externally to said helix. Said folds 5a and 5b are preferably located opposite to the components to be made leaktight, these components having been omitted from the drawings.

Any expansion of the helix 1 tends to displace the folds 5a and 5b outwards and consequently in the direction of the components to be sealed, thereby tightly applying the seal against said components. When a seal of this type is employed between two components which are brought to a temperature other than the temperature of the surrounding atmosphere, no mechanical clamping stress need be exerted on the seal by said components or at the most a low stress would be sufficient.

In fact, when the layer 2 of metal has a low coefficient of expansion whilst the metal 3 has a distinctly higher coefficient of expansion, for example when the metal 2 is nickel whilst the metal 3 is copper, a temperature rise causes a deflection in the direction of the low-coefficient metal 2, that is to say a contraction of the helix; conversely, a temperature drop results in expansion of the helix or in other words in an increase in diameter of the turns. A temperature drop therefore results in self-tightening of the seal against the components to be made leaktight. A temperature rise causes a reduction in diameter of the helix 1, that is to say the contraction of the packing element which accordingly moves away from the components to be sealed.

A seal of this type is therefore particularly well suited for ensuring tightness of any apparatus which operates at low temperatures and especially cryogenic devices. In fact, by making use of suitable metals, it has been possible to obtain extremely effective leaktightness down to extremely low temperatures of the order of $-250°$ C.

However, it may be prove advantageous to combine the helix 1 with another helix which is also formed of two metals having different coefficients of expansion but placed in the reverse order to that the metal which has a low coefficient of expansion is placed at the exterior of the helix. The deflection of this second helix is carried out in the direction opposite to that of the first. The helix 1 ensures leaktightness at low temperatures whilst the other helix ensures leaktightness at high temperatures. The two helices can be placed within the same sheath 4 or within two separate sheaths so as to form two complementary seals.

Moreover, the sheath 4 can have any shape and thickness which are suited to the space provided between the components to be made leaktight. In particular, said sheath can have a uniform cross section which may be circular, for example, and need not be closed so that expansion of the core is thereby facilitated.

Figure 3:
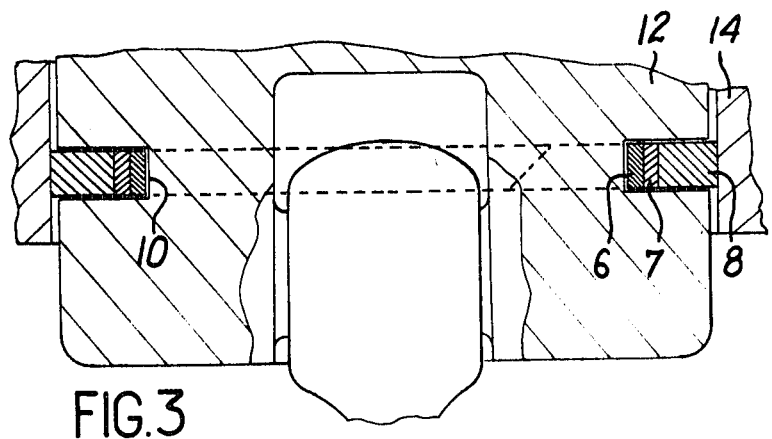
FIG. 3 is an axial sectional view of a seal which is employed as a piston ring.

FIG. 3 shows an alternative embodiment of said seal in which the core is constituted by a bimetallic strip 6—7 which is wound in the form of a ring and surrounded by a friction packing 8. This seal is placed within the groove 10 of a piston 12 which is capable of moving within the interior of a cylinder 14 and performs the function of a piston ring.

As in the case of the seal of FIGS. 1 and 2, the core 6, 7 of said piston ring is constituted by a metal 6 having a low coefficient of expansion which is placed internally and opposite to the bottom of the groove 10 and by a metal 7 having a high coefficient of expansion which is placed externally, that is to say in contact with the packing 8. An elevation in temperature therefore results in contraction of the core ring, that is to say in a reduction in diameter of the winding 6,7. The seal is then tightly applied against the bottom of the groove 10. On the other hand, a reduction in temperature causes expansion and resultant elongation of the ring and thrusts the packing 8 against the cylinder 14. The piston which is fitted with a piston ring of this type consequently ensures constant leaktightness inasmuch as the seal according to the invention becomes progressively more active as the temperature falls whereas in the case of piston rings of usual types, any cooling process causes shrinkage.

However, it can prove necessary in some cases to have only a single seal which provides effective tightening action both at low temperatures and at high temperatures.

Figure 4:
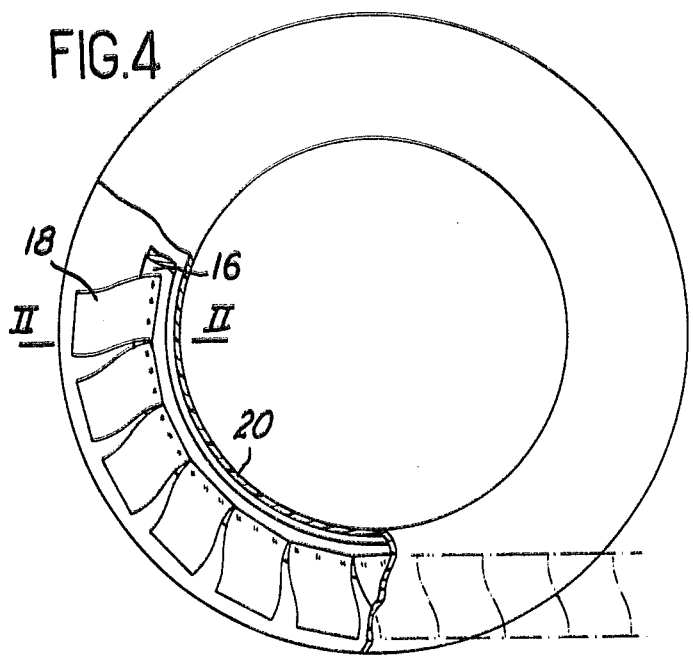
FIG. 4 is an external view which is partially broken away and shows an alternative embodiment of the self-tightening seal.
Figure 5:
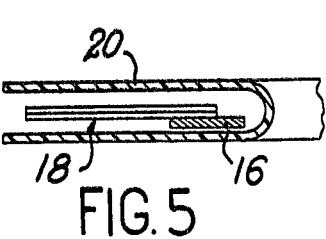
FIG. 5 is a sectional view taken along line II—II of FIG. 4 and showing the seal in the rest position.
Figure 6:
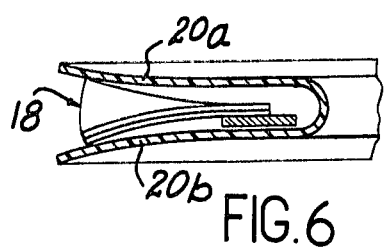
FIG. 6 is another sectional view taken along line II—II of FIG. 4 but showing the seal in the active position.

Provision is made in that case for a seal as illustrated in FIGS. 4, 5 and 6. This seal comprises a flat ring 16 on which are welded strips 18 formed of bimetal. On each side of their point of attachment, said strips have slightly inclined and curved sides, having been cut from a previously rolled plate in a direction which makes substantially an angle of 45° with the direction of rolling, with the result that the side walls of the strips are inclined with respect to the fibers of the metals. Said strips are attached at one end to the ring 16 by spot welding, for example, but are free at the other end and are thus disposed substantially radially around said ring. Both the strips and the ring 16 are mounted within the interior of a packing element 20 which is open at the periphery thereof and has a substantially U-shaped cross section as shown in FIGS. 5 and 6.

At the time of a change in temperature, namely either an increase or decrease, the strips are twisted and assume substantially the shape of a helix so that one corner of the free extremity of each strip is lifted towards the top wall 20a of the packing element whilst the other corner drops towards the bottom wall 20b of said packing element. Each strip 18 is thus applied against both walls of said packing element and tends to displace said walls outwards by exerting an effort in the direction of the components to be sealed.

Reduction and elevation of temperature produce deformations in opposite directions but in all cases each strip is in contact with both the wall 20a and the wall 20b of the packing element. Said element is thus tightly applied against the components to be sealed irrespective of any variations in temperature. Extremely effective leaktightness is thus obtained regardless of operating conditions. It has in fact been possible to ensure effective leaktightness within a temperature range extending from −250° C. to +650° C., for example.

As is readily apparent, a number of further modifications could be made in the forms of construction which have just been described without thereby departing from the scope of the invention. In each form of construction, the choice of metals which constitute the bimetal as well as the number of metal layers of the core make it possible to determine the deflection of the core and therefore the deformation of the seal, that is to say the conditions of the tightening action of said seal. Moreover, the shape of the core and of the packing element can readily be adapted to the shape of the components to be sealed. Provision can thus be made for seals which correspond exactly to each condition of utilization.

What we claim is:

1. A self-tightening seal which comprises a deformable external packing element and a core formed of at least two metals having a different coefficient of expansion, a metal having a high coefficient of expansion being placed opposite to the packing element and a metal having a low coefficient of expansion being superposed on and intimately bonded to the first so that the differential expansion of said metals under the effect of a reduction in heat causes deformation of said packing element, said core being a helically wound bimetallic core, the metal which has a low coefficient of expansion being at the center, said core being within the interior of a flexible sheath.

2. A seal in accordance with claim 1, wherein the helically wound core and the flexible sheath are annular.

3. A self-tightening seal which comprises a deformable external packing element and a core formed of at least two metals having a different coefficient of expansion, a metal having a high coefficient of expansion being placed opposite to the packing element and a metal having a low coefficient of expansion being superposed on and intimately bonded to the first so that the differential expansion of said metals under the effect of a reduction in heat causes deformation of said packing element comprising a ring adapted to carry strips which are cut obliquely in the direction of rolling of the bimetal and twisted as a result of any temperature variation and an external packing element in the form of a sheath whose parallel walls are thrust outwards by each of said strips.

4. A seal in accordance with claim 3, wherein the sheath which forms a packing element has an open transverse cross section.